United States Patent
Bshara et al.

(10) Patent No.: US 11,416,749 B2
(45) Date of Patent: Aug. 16, 2022

(54) EXECUTION SYNCHRONIZATION AND TRACKING

(71) Applicant: Amazon Technologies, Inc., Seattle, WA (US)

(72) Inventors: Nafea Bshara, San Jose, CA (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 918 days.

(21) Appl. No.: 16/216,873

(22) Filed: Dec. 11, 2018

(65) Prior Publication Data

US 2020/0184342 A1 Jun. 11, 2020

(51) Int. Cl.
| | | |
|---|---|---|
| *G06N 3/10* | (2006.01) | |
| *G06F 9/30* | (2018.01) | |
| *G06F 9/54* | (2006.01) | |
| *G06N 3/063* | (2006.01) | |
| *G06F 9/38* | (2018.01) | |

(52) U.S. Cl.
CPC ............ *G06N 3/10* (2013.01); *G06F 9/30101* (2013.01); *G06F 9/3855* (2013.01); *G06F 9/542* (2013.01); *G06N 3/063* (2013.01)

(58) Field of Classification Search
CPC .................................................. G06F 9/30101
See application file for complete search history.

(56) References Cited

U.S. PATENT DOCUMENTS

| | | | |
|---|---|---|---|
| 7,379,860 B1 | 5/2008 | Bartz et al. | |
| 7,681,078 B2 | 3/2010 | Moyer | |
| 7,865,771 B2 | 1/2011 | Yang | |
| 7,962,314 B2 | 6/2011 | Chernoff | |
| 8,095,917 B2 | 1/2012 | Stall | |
| 8,499,287 B2 | 7/2013 | Shafi et al. | |
| 8,578,213 B2 | 11/2013 | Han et al. | |
| 9,092,332 B2 | 7/2015 | Taylor et al. | |
| 9,104,599 B2 | 8/2015 | Atkisson et al. | |
| 9,442,824 B2 | 9/2016 | Gainey, Jr. et al. | |
| 9,442,842 B2 | 9/2016 | Yadav et al. | |
| 10,746,792 B1* | 8/2020 | Diamant | G01R 31/31727 |

(Continued)

OTHER PUBLICATIONS

U.S. Appl. No. 16/200,602, filed Nov. 26, 2018 Titled "Configurable Reporting for Device Conditions".

(Continued)

*Primary Examiner* — Michael J Metzger
(74) *Attorney, Agent, or Firm* — Kilpatrick Townsend & Stockton LLP

(57) ABSTRACT

An integrated circuit includes a processing engine configured to execute instructions that are synchronized using a set of events. The integrated circuit also includes a set of event registers and an age bit register. Each event in the set of events corresponds to a respective event register in the set of event registers. The age bit register includes a set of age bits, where each age bit in the age bit register corresponds to a respective event register in the set of event registers. Each age bit in the age bit register is configured to be set by an external circuit and to be cleared in response to a value change in a corresponding event register in the set of event registers. Executing the instructions by the processing engine changes a value of an event register in the set of event registers.

20 Claims, 8 Drawing Sheets

(56) References Cited

U.S. PATENT DOCUMENTS

| | | |
|---|---|---|
| 2008/0010621 A1 | 1/2008 | Williams |
| 2009/0049312 A1 | 2/2009 | Min |
| 2010/0332909 A1 | 12/2010 | Larson |
| 2012/0124047 A1 | 5/2012 | Hubbard |
| 2013/0346594 A1 | 12/2013 | Banerjee et al. |
| 2014/0200855 A1* | 7/2014 | Oonk ............... H04L 67/12 702/189 |
| 2014/0305525 A1 | 10/2014 | Le Moing et al. |
| 2015/0100767 A1 | 4/2015 | Topham |
| 2015/0100842 A1 | 4/2015 | Rao et al. |
| 2016/0142940 A1 | 5/2016 | Teo et al. |
| 2017/0083434 A1 | 3/2017 | Potash |
| 2017/0083464 A1 | 3/2017 | Potash |
| 2018/0307551 A1* | 10/2018 | Bacha ............ G06F 11/0766 |
| 2018/0365017 A1 | 12/2018 | Shirvani et al. |

OTHER PUBLICATIONS

U.S. Appl. No. 16/200,620, filed Nov. 26, 2018 Titled "Operational Management of a Device".

U.S. Appl. No. 16/216,855, filed Dec. 11, 2018 Titled "Event-Based Device Performance Monitoring".

U.S. Appl. No. 16/146,834, filed Sep. 28, 2018 Titled "Reconfigurable Instruction".

"Embedded Trace Buffer", Texas Instruments Wiki, Available online at: https://processors.wiki.ti.com/index.php/Embedded_Trace_Buffer, 2020, 10 pages.

"U.S. Appl. No. 16/145,050", Notifications in Integrated Circuits, filed Sep. 27, 2018.

* cited by examiner

EXECUTION SYNCHRONIZATION AND TRACKING

BACKGROUND

A complex computer system, such as a neural network processor, may include multiple processing units functioning in parallel. For example, a neural network may include multiple layers of processing nodes. Each processing node on a layer may perform computations on data generated by processing nodes on the preceding layer to generate new output data. In many implementations, in order to improve the performance, the complex computer system may be configured to perform parallel processing using complex circuits that may include multiple processing units or processing engines. In many cases, it may be challenging to synchronize and track the execution of the multiple processing units and other circuits in the complex computer system.

BRIEF DESCRIPTION OF THE DRAWINGS

Various embodiments in accordance with the present disclosure will be described with reference to the drawings, in which.

DETAILED DESCRIPTION

Figure 1:
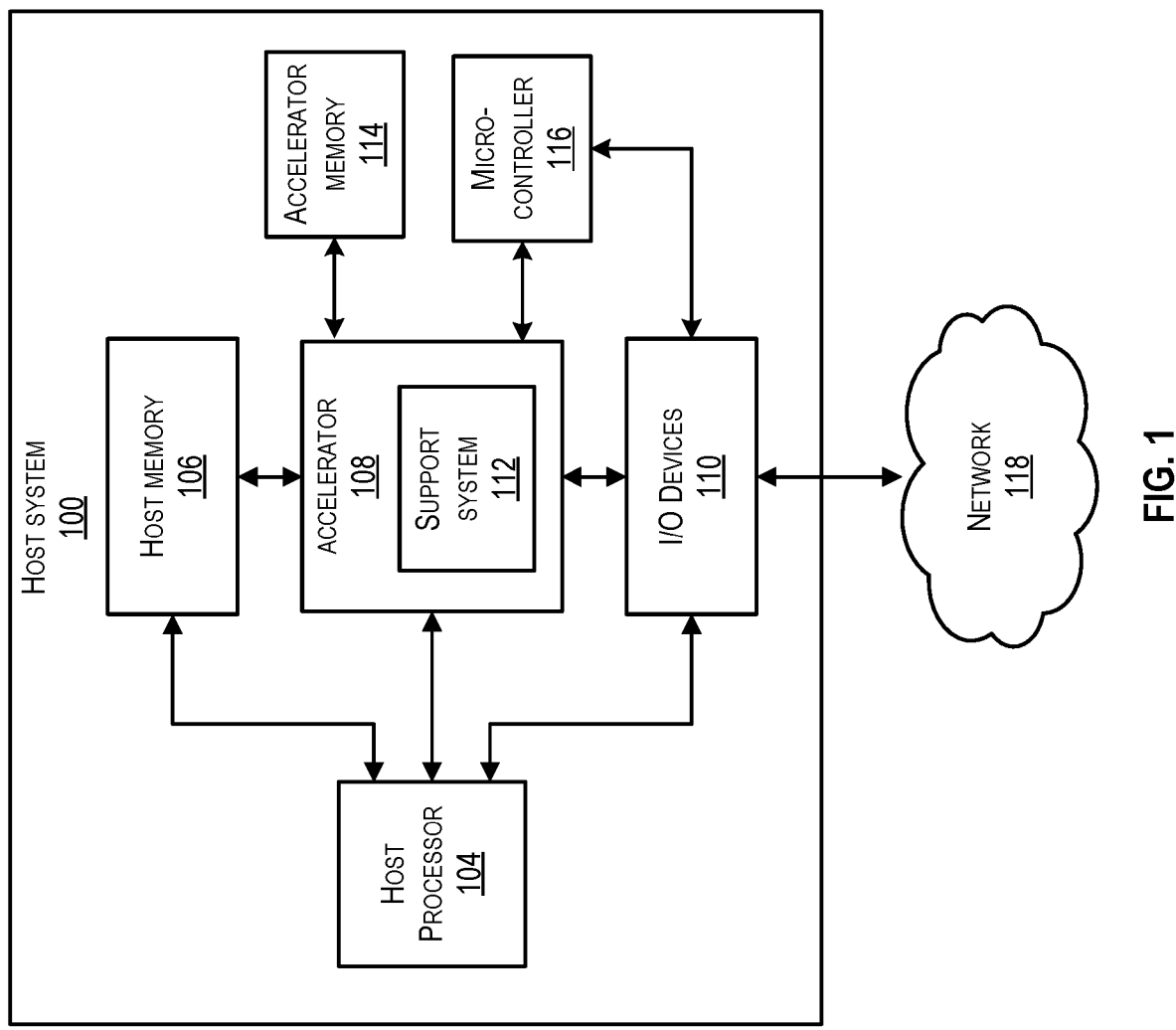
FIG. 1 is a block diagram of an example of a host system according to certain embodiments.

Techniques disclosed herein relate generally to synchronizing and tracking the execution of a complex computing system, such as a host server configured to implement one or more neural networks (e.g., deep neural networks). Due to the complexity of the software and hardware of the complex computing system that may be configured for parallel processing, it may be difficult to synchronize the operations or instructions performed by the different processing circuits, and track activities of the different processing circuits or the status of certain scheduled operations. For example, a neural network may include multiple processing engines, and each processing engine may run independently in multiple threads to perform millions or billions of arithmetic operations that may have data or resource dependencies. Thus, the performance of the operations or instructions by the multiple processing engines may need to be streamlined and synchronized. In addition, if deadlocks, interrupts, errors, or other situations that may cause stalls of the execution have occurred, a host server may need to determine the status of the scheduled operations and the activities of the processing units in order to determine the root cause of the stalls. Because of the large circuitry, the large amount of computation performed by the neural network, and the parallel execution of different operations by different processing engines, it may be difficult to accurately and efficiently synchronize and track the operations or instructions performed by the different processing circuits.

According to certain embodiments, a description of a network may be compiled to generate code to be executed by the processing engines and to generate events for synchronizing and tracking the execution of the code by the processing engines. During the execution of the code by the processing engines, event registers may be cleared (e.g., locally) or set (e.g., remotely) by the processing engines, where some processing engines may clear certain event registers, execute some code, and then wait for the setting of the cleared event registers before continue to execute the code. The event registers may be maintained in an event table in each respective processing engine, and may be memory mapped such that they may be accessed by other processing engines or a host. Each event register may correspond to one event and may be read by software to determine the status of the corresponding event. In some embodiments, the state of each event may be indicated by a respective bit in event summary registers, such that the status of all events may be checked by reading the event summary registers. In this way, the execution of code by the processing engines may be synchronized based on the status of the events, which may be cleared or set by various processing engines. Furthermore, the events may be used to set software breakpoints. In addition, when an event is set or cleared, an event notification message may be generated and saved.

In some embodiments, one or more age bit registers associated with a respective processing engine may be used to monitor and debug the execution of the code by the processing engines, where each age bit in the one or more age bit registers may correspond to a respective event and a respective event register. An age bit may be set by the host and may be cleared when a status of a corresponding event register changes, such as when the event register is set or cleared by a processing engine. In some embodiments, an age bit may only be cleared when the corresponding event register is set or may only be cleared when the corresponding event register is cleared.

The host may read the age bit registers periodically or after a certain time period (e.g., when the execution is expected to have completed) to determine whether an event has changed status as expected or has changed status unexpectedly, or whether an event has not changed status due to an error or stall during the execution of the code by the processing engines. In some embodiments, upon determining that an event has changed status unexpectedly or has not changes status as expected, the host may read the corresponding event register and/or the associated event notification messages to determine the root cause of the error or stall that occurred during the execution of the code by the processing engines. In this way, the host may only need to read one or a few registers in order to determine whether the code is executed as expected or desired by the different processing engines.

Techniques disclosed herein may be used to synchronize and track the parallel execution of operations by multiple function blocks of a computing system in a pipeline, in multiple threads, or using superscalar techniques.

As used herein, an "event" may refer to an indicator of an execution status of an operation associated with one or more instructions. An event may be a flag that can be set or cleared to indicate whether an operation is being performed or has been completed. An event may be set by writing, for example, a logic "1" to a corresponding register (referred to as an event register) and may be cleared by writing, for example, a logic "0" to the corresponding register. Events may be used to synchronize or coordinate the operations of different functional blocks of a circuit or a system. For example, one functional block may need to wait for another functional block to complete an operation (which may be indicated by a change of status of the event or a change of value in an event register) before starting an operation. In one specific example, a convolution engine in a neural network processor may need to wait for a DMA engine to move a dataset from a memory to a local buffer before starting to perform the convolution on the dataset. To enforce such an order of execution, a coordination engine may clear an event associated with data movement by the DMA and trigger the data movement by the DMA. The coordination engine may not trigger the convolution engine to perform convolution on the dataset before the data movement is complete, which may be indicated by the event being set by, for example, the DMA engine. After the event is set, the coordination engine may trigger the convolution on the dataset by the convolution engine. In some embodiments, the events may also be used to determine the branch to take in the execution flow.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 is a block diagram of an example of a host system 100 according to certain embodiments. Host system 100 can include an accelerator 108, a host processor 104, a host memory 106, and I/O devices 110. In some embodiments, accelerator 108 may include a support system 112 and may be coupled to a microcontroller 116 and an accelerator memory 114. In some implementations, host system 100 may include other hardware that is not illustrated here.

Host processor 104 may include a general purpose integrated circuit that is capable of executing program instructions. Host processor 104 can also be referred to as a CPU. Host processor 104 may be responsible for the overall management, control, and execution of host system 100, including, for example, executing an operating system for host system 100. In some embodiments, host processor 104 may include multiple processing cores. In some embodiments, host system 100 may include more than one host processor. In some embodiments, host processor 104 and accelerator 108 may be one chip or may be on one or more integrated circuits within the same package. In some embodiments, host processor 104 may communicate with accelerator 108 using a PCIe interface or other suitable interface.

Host memory 106 may include a memory device that can be used by host processor 104 for storage of program code to be executed by host processor 104, as well as for storage of data that is being operated on by host processor 104. Host memory 106 may include, for example, a DRAM, an SDRAM, an SRAM, or any volatile and/or non-volatile memory in various implementations. In some embodiments, accelerator memory 114 may include memory for accelerator 108. Accelerator memory 114 may include an SRAM or any volatile and/or non-volatile memory. In some embodiments, host memory 106 may also be accessible to accelerator 108. For example, host memory 106 may include separate memory or memory banks for host processor 104 and accelerator 108.

I/O devices 110 may include hardware for connecting to user input and output devices, such as keyboards, monitors, and printers, among other devices. I/O devices 110 may also include storage drives and/or a network interface for connecting to a network 118.

In various implementations, support system 112 may include hardware for coordinating the operations of accelerator 108. For example, support system 112 may include one or more data management processors, which may manage movement of data into and out of accelerator 108. In some examples, support system 112 may be a part of accelerator 108. In some examples, support system 112 may not be a part of accelerator 108. In some examples, the data management processors and accelerator 108 may be on one device, such as on integrated circuits on a same die, or in a same package.

The software programs executed by host processor 104 can receive or generate input for processing by accelerator 108. The programs may include, for example, graphics intensive programs such as computer-aided design programs, computationally intensive programs such as modeling programs, or artificial intelligence programs such as speech recognition or image recognition programs. In various examples, host processor 104 may receive tasks or software programs, offload at least some operations of the received tasks or software programs o to accelerator 108, which may perform the operations more quickly than host processor 104.

To assist host processor 104 in using accelerator 108, host processor 104 may execute a host driver or driver program. The host driver may provide an interface through which an operating system can send requests to accelerator 108 and receive results from accelerator 108. Upon receiving a request, which may include data and an operation to be performed on the data, the host driver can manage the execution of the operation by accelerator 108, leaving the operating system free to perform other operations.

In some embodiments, the host driver may manage the execution of the operation by accelerator 108 by programming and activating a data management processor, which may be a component in support system 112 or elsewhere in accelerator 108. Programming the data management processor may include, for example, configuring the data management processor, triggering a DMA transaction to copy instructions or data from host memory 106 to the data management processor, and triggering the data management processor to execute the instructions. Once the data management processor begins executing code, the host driver may not need to take further action until the operation being performed by accelerator 108 is finished.

In some embodiments, the instructions executed by the data management processor may configure accelerator 108, including copying instructions and input data into accelerator 108 and triggering accelerator 108 to begin execution of the instructions. The data management processor may wait on accelerator 108 to finish performing the operation, and may then copy any result of the operation from accelerator 108 into host memory 106. For example, the data management processor can inform the host driver that results are ready, such that the host driver may then inform the operating system or the program for which the result was computed.

Microcontroller 116 may include a general purpose microcontroller configured to execute firmware to manage accelerator 108. For example, microcontroller 116 may configure the reporting mechanisms in accelerator 108 according to certain embodiments. In some implementations, microcontroller 116 may have higher privileges than the host driver executing on host processor 104.

Figure 2:
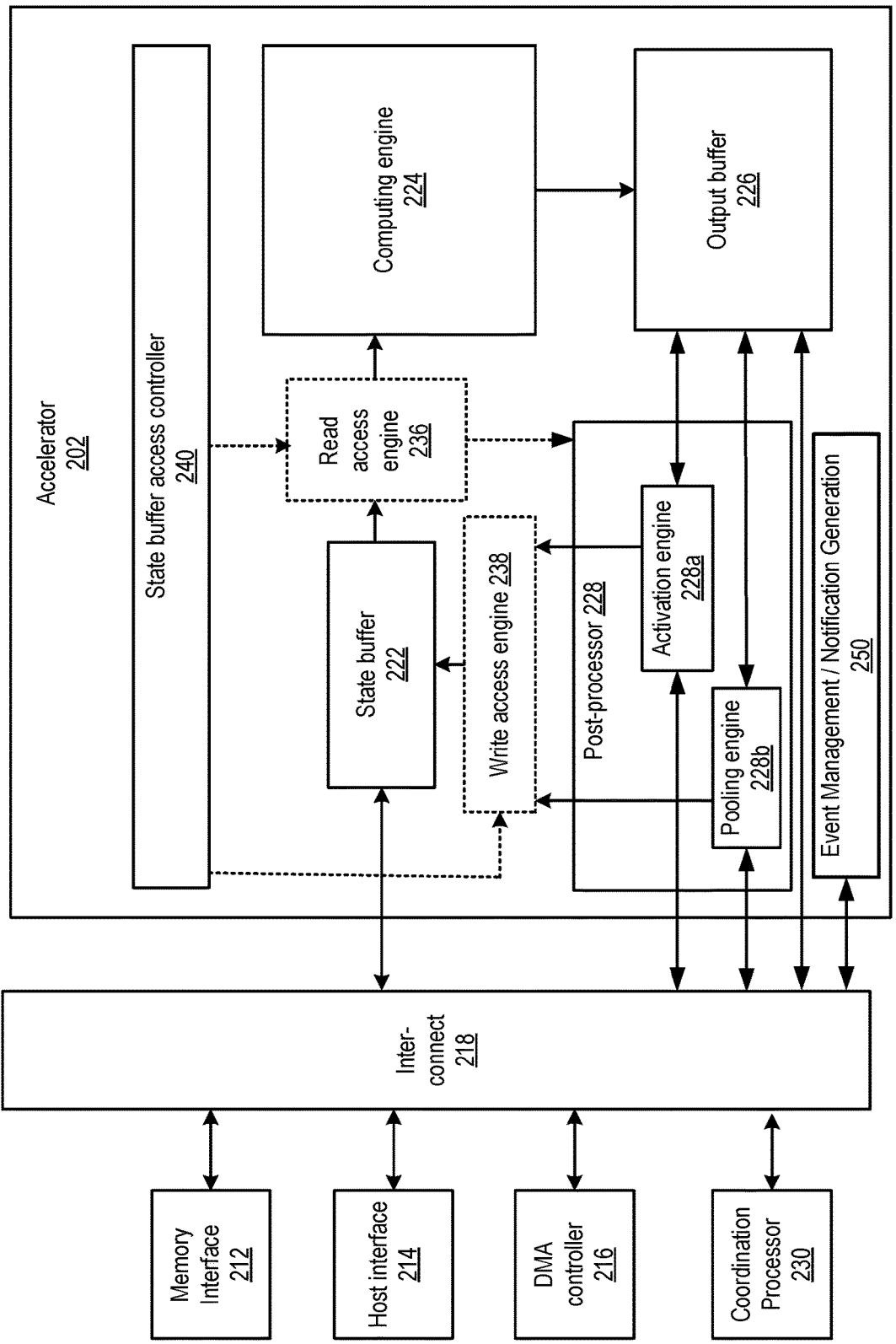
FIG. 2 illustrates an example apparatus for an example artificial neural network according to certain embodiments.

FIG. 2 illustrates an example apparatus 200 for an example neural network according to certain embodiments. Apparatus 200 may be part of a computer system, such as a data center server or host system 100. In some embodiments, apparatus 200 may be part of a multi-tenant compute service system (e.g., a cloud) and may communicate with a host device (not shown in FIG. 2), such as host processor 104 of FIG. 1, to provide computing and memory resources for a computing service. Apparatus 200 may include an accelerator 202 (which may be part of accelerator 108) coupled to a memory interface 212 (such as a memory controller), a direct memory access (DMA) controller 216, and a host interface 214 via an interconnect 218. Apparatus 200 may also include a coordination processor 230, which may be part of support system 112, such as the data management processor described above and in detail below. Accelerator 202 may provide computing resources to support inference using a trained neural network. More detail of the operation of accelerator 202 is described below.

Memory 212 may be connected to a memory device (e.g., host memory 106 or accelerator memory 114), and may be configured to store executable instructions, input data (e.g., pixel data of images), and weights (e.g., the filter parameters) or other parameters of the trained neural network received from, for example, a host device (e.g., host processor 104) or an I/O device (e.g., I/O devices 110). The memory device may also be used to store the output of accelerator 202 (e.g., one or more image recognition decisions on the input images) or some intermediary data. The memory device may include any suitable memory, such as dynamic random access memory (DRAM), synchronous DRAM (SDRAM), double data rate DRAM (DDR DRAM), storage class memory (SCM), flash memory devices, and the like.

DMA controller 216 may be configured to perform DMA operations to transfer data between accelerator 202 and the host device or the memory device (e.g., through memory interface 212). For example, the host device may store the instructions, input data, the weights, and other parameters of the neural network at the memory device connect to memory interface 212. The host device may provide the memory addresses for the stored instructions, data, weights, and other parameters of the neural network to accelerator 202 (e.g., in the form of memory descriptors). Accelerator 202 may then obtain the stored instructions, data, weights, or other parameters of the neural network using DMA controller 216 based on the memory addresses provided by the host device. In some embodiments, the host device may provide the memory addresses for the stored instructions, data, weights, and other parameters of the neural network to coordination processor 230, and coordination processor 230 may handle the data movement from memory 212 to accelerator 202 using DMA controller 216. Accelerator 202 may also store the results of computations (e.g., one or more image recognition decisions or intermediary data) at the memory device through memory interface 212, and provide the memory addresses for the stored results to the host device.

Host interface 214 may enable communications between the host device and accelerator 202. For example, host interface 214 may be configured to transmit the memory descriptors including the memory addresses of the stored data (e.g., input data, weights, results of computations, etc.) between the host device and accelerator 202. Host interface 214 may include, for example, a peripheral component interconnect express (PCIe) interface or any suitable interface for communicating with the host device.

Accelerator 202 may provide the computing resources to support the neural network computations for inference, such as image classification. In the example shown in FIG. 2, accelerator 202 may include an integrated circuit, such as a system-on-chip (SoC), FPGA, or ASIC. Accelerator 202 may include a number of circuit components, such as a state buffer 222, a computing engine 224, an output buffer 226, and a post-processor 228. In some implementations, accelerator 202 may also include a read access engine 236 and a write access engine 238 to provide computing engine 242 and post-processor 228 with read and write access to state buffer 222 as discussed in detail below.

State buffer 222 may be configured to provide caching of data used for computations at computing engine 224. The data cached at state buffer 222 may include, for example, the input data and weights obtained from the memory device through memory interface 212, output data from computing engine 224, and/or output data from post-processor 228. The caching may reduce the effect of memory access bottleneck (e.g., caused by the latencies at memory interface 212, DMA controller 216, interconnect 218, etc.) on the performance of computing engine 224.

State buffer 222 may be an on-chip memory device and may include, for example, static random access memory (SRAM). In some embodiments, state buffer 222 may be partitioned based on the organization of computing engine 224. For example, state buffer 222 may include multiple SRAM banks, where each bank may be configured to store input data and weights for a row of computing engine 224.

Computing engine 224 may include an array of processing elements (PEs, also referred to as a PE array) configured to perform one or more arithmetic operations (e.g., vector multiplication) for neural network computations. In some implementations, computing engine 224 may be a matrix multiplication unit that may be used for matrix convolution and/or matrix multiplication, and thus may be used to implement a convolution layer or a fully-connected layer of the neural network. For example, in some implementations, computing engine 224 may include a systolic array that includes a two-dimensional array of processing elements arranged in rows and columns for matrix multiplication. In some implementations, computing engine 224 may include circuits for quantizing input data before performing the arithmetic operations (e.g., from floating point numbers to integer numbers) so as to reduce the complexity of the arithmetic operations.

Post-processor 228 may be configured to perform post-processing on the outputs of computing engine 224 that may be stored in output buffer 226. In the example shown in FIG.

2, post-processor 228 may include an activation engine 228a and a pooling engine 228b. Activation engine 228a may perform one or more activation (non-linear) functions, such as tanh, sigmoid, ReLU, etc., on the outputs of a convolution layer to generate the output data, and store the output data in state buffer 222. In some implementations, activation engine 228a may also include one or more multiplier circuits. In some implementations, activation engine 228a may also perform de-quantization between layers. Pooling engine 228b may perform, for example, maximum pooling, average pooling, etc., on the outputs of a convolution layer or activation engine 228a to generate subsamples, and store the subsamples in state buffer 222. In some implementations, pooling engine 228b may also include one or more multiplier circuits. In some implementations, pooling engine 228b may also perform residue-add for residual learning (e.g., to implement a ResNet) or other arithmetic logic operations. Pooling engine 228b and/or activation engine 228a may also be controlled to be skipped for certain convolution layers. For example, as discussed above, a CNN may perform multiple convolution and ReLU operations before performing a pooling operation.

In some implementations, post-processor 228 may also include a Softmax engine (not shown in FIG. 2) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 236 may provide read access to state buffer 222 for a read access requesting device including, for example, computing engine 224 and post-processor 228. Write access engine 238 may provide write access to state buffer 222 for a write access requesting device including, for example, post-processor 228. Each of read access engine 236 and write access engine 238 may convert a sequential series of access operations (e.g., multiple read or write operations across multiple clock cycles) to a single access operation to reduce power and reduce wait latency. Each of read access engine 236 and write access engine 238 may be organized based on state buffer 222. For example, each of read access engine 236 and write access engine 238 may include multiple sub-engines corresponding to multiple SRAM banks of state buffer 222, with each sub-engine providing access to a corresponding SRAM bank. A sub-engine of read access engine 236 may convert a sequential series of read access operations to a corresponding SRAM bank for multiple data elements (e.g., by a row of computing engine 224 or by post-processor 228) to a single read access for the multiple data elements. A sub-engine of write access engine 238 may also convert a sequential series of write accesses for storing multiple data elements at the corresponding SRAM bank (e.g., by post-processor 228) to a single write access for the multiple data elements.

In some embodiments, accelerator 202 may also include an event management and notification generation unit 250. Events may be used to enforce dependencies or ordering between instructions running on different engines, which may be synchronized or not synchronized. For example, event management and notification generation unit 250 may manage events, for example, for synchronizing DMA data movement, processing engine execution, software breakpoints, etc., and/or generate notification messages that include information for debug purposes.

In some embodiments, coordination processor 230 may also include an event management and notification generation unit for handling the parallel processing and coordinating the operations of the different processing engines in accelerator 202 and DMA controller 216 as described in details below. The event management and notification generation unit in coordination processor 230 may also manage events, for example, for synchronizing DMA data movement, processing engine execution, software breakpoints, etc., and/or generate notification messages that include information for debug purposes.

One or more accelerators 202 may be used to implement a deep neural network that may include multiple sets of convolution, activation, and pooling layers. For example, accelerator 202 may first receive input data and instructions for implementing a first set of convolution, activation, and/or pooling layers. The input data may include the network parameters for the first set of network layers, such as the number of nodes, the weights, or the parameters of the filters, etc. The input data may also include the external input data to be processed by the neural network or intermediate output data from previous layers of the neural network. The instructions may include instructions for computing engine 224, activation engine 228a, and/or pooling engine 228b. After the input data are processed by the first set of network layers, new input data and instructions for implementing a second set of convolution, activation, and/or pooling layers may be received by accelerator 202. The new input data may include parameters for the second set of network layers and intermediate output data from the previous layers, and the new instructions may include the instructions to be executed by the processing engines to implement the second set of network layers. In this way, an accelerator 202 may be used to implement multiple sets of network layers. As such, a deep neural network (e.g., a ResNet-50 network with 50 layers) may be implemented using a smaller number (e.g., 1, 2, 4, or 8) of neural network processors.

A neural network that has been trained may be represented by a neural network model that may describe the network architecture (e.g., layers and connection between nodes on the layers) and various parameters associated with the neural network. The neural network model may be a functional model described in a higher level programming language or hardware description language, such as C, C++, C#, Java#, python, R, Haskell, D, Ocaml, LISP, MatLab, etc. The neural network model may be compiled by a compiler to generate executable instructions. The compiler may convert a neural network model into machine-executable instructions, such as binary instructions, that may be executed by various functional blocks (e.g., processing engines) of the neural network. The compiler may manage the allocation of different operations of the neural network to various hardware resources (e.g., processing engines), the allocation of memory for storing neural network parameters and intermediate data, and the timing and synchronization conditions between the various hardware resources. For example, the compiler may assign an multiplication operation to a PE array (e.g., the PE array in computing engine 224) or an activation engine (e.g., activation engine 228).

In some embodiments, the compiler may maintain a list of available hardware resources and the functions and usage of the hardware resources of the neural network, and assign operations of the neural network to appropriate hardware resources based on the functions and usage of the hardware resources. The compiler may specify the source memory address where the input data for an operation may be stored, and allocate memory space for storing the output data for the operation. The compiler may also determine the order of the operations to be executed by the various processing engines.

The compiler may manage the synchronization between the processing engines. For example, the compiler may determine that a second operation by a processing engine may not start until the completion of a first operation by another processing engine, such as after the output data of the first operation has been written into a memory device.

The compiler may generate executable instructions to be executed by the processing engines. In some embodiments, one set of instructions may be generated for each respective processing engine. The instructions may include machine readable and executable code, such as binary code. The instructions may include certain timing for the instructions, such as the wait time between two instructions or the conditions to be met before starting an instruction. During run time, the instructions may be loaded into the respective instruction buffers for the processing engines and executed by the processing engines.

The compiler may be used to generate instructions for executing by different functional blocks in parallel (e.g., instruction level parallelism) to maximize the performance of the computing system. Several techniques may be used to achieve the instruction level parallelism, such as, for example, multi-threading, pipelining, and superscalar processing. Pipelining may use a fixed latency between the different stages (e.g., dictated by the worst-case latency), enforce strict ordering between stages, and may incur certain inefficiencies (e.g., pipeline bubbles).

For example, in the multi-threading technique, each processing engine may run its own set of instructions. In the superscalar technique, a single set of instructions may be sequenced to different processing engines. To reduce hardware complexity, the multi-threading technique may be selected over the superscalar technique. The compiler may generate a set of instructions for each respective processing engine, such as the PE-array, activation engine, or pooling engine, and the processing engines may execute the sets of instructions synchronously or asynchronously, where the execution of the instructions by the different processing engines may be coordinated through events as described in detail below. The asynchronous execution of the instructions by the different processing engines may allow fine-grained software control and enable weight-loading (to the PE array) and matrix-multiplication (by the PE array) in parallel.

In some embodiments, the compiler may determine a set of events that can be used to synchronize the parallel execution of different processing engines or other functional blocks. In some embodiments, some events may correspond to certain labels in the network model defined by users.

Figure 3:
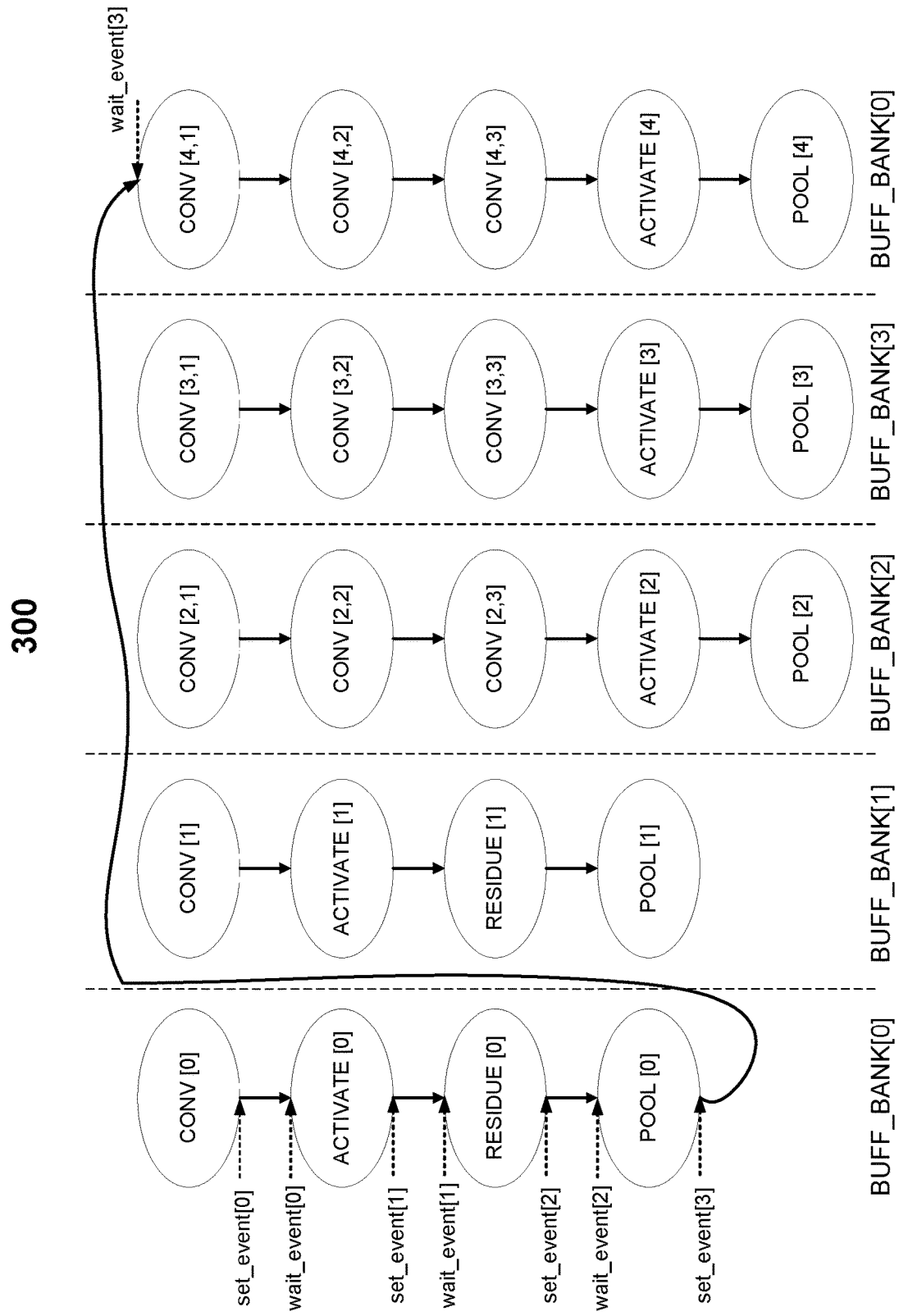
FIG. 3 illustrates an example of using events to coordinate processing of a network according to certain embodiments.

FIG. 3 is a flow diagram 300 illustrating an example of using events to coordinate processing of a network according to certain embodiments. Each processing engine may perform its own set of operations or instructions in serial. For example, the convolution engine (e.g., the PE array) may execute convolution operations CONV[0], CONV[1], CONV[2,1], CONV[2,2], CONV[2,3], CONV[3,1], CONV [3,2], CONV[3,3], CONV[4,1], CONV[4,2], and CONV[4, 3] in serial. Similarly, the activation engine may execution activation operations ACTIVATE[0], ACTIVATE[1], ACTIVATE[2], ACTIVATE[3], and ACTIVATE[4] in serial.

In the example shown in FIG. 3, there is no implicit dependency between operations performed on different processing engines, and each processing engine may perform its operations in serial. The order of performing the operations by the different processing engines may only be enforced when there is a data or resource dependency between the operations. Thus, the pipeline bubbles (idle time) may be reduced or avoided. The order of performing the operations by the different processing engines, when needed, may be enforced through events.

For example, there may be data dependency between operation CONV[0] and operation ACTIVATE[0] because operation ACTIVATE[0] may use data generated by operation CONV[0]. In addition, operations in each column shown in FIG. 3 may use a same bank in an output buffer of the neural network processor, such as output buffer 226 of accelerator 202. Thus, the operations in each column shown in FIG. 3 may have both data dependency and resource dependency. In addition to operations CONV[0], ACTIVATE[0], RESIDUE[0], and POOL[0] in the first column of FIG. 3, operations CONV[4,1], CONV[4,2], CONV[4,3], ACTIVATE[4], and POOL[4] in the fifth column in FIG. 3 may also use bank [0] in output buffer 226 of accelerator 202. Thus, even if there is no data dependency between operation POOL[0] and operation CONV[4,1], there may be a resource dependency between operation POOL[0] and operation CONV[4,1].

As shown in FIG. 3, to enforce the data or resource dependency, an event event[0] may be set when the execution of operation CONV[0] by the PE array is complete, and the activation engine may wait for event[0] before starting to execute operation ACTIVATE[0]. Similarly, an event may be set after the execution of each operation in column 1 is complete, and each subsequent operation may be started after the event has been set, which may indicate the operation associated with event may have been completed. In addition, the PE array may wait for an event (e.g., event[3]) set after the operation POOL[0] by the pooling engine is complete, before starting to execute convolution operation CONV[4,1], in order to avoid corrupting data in bank[0] that may be used or generated by the pooling engine when executing operation POOL[0].

Figure 4:
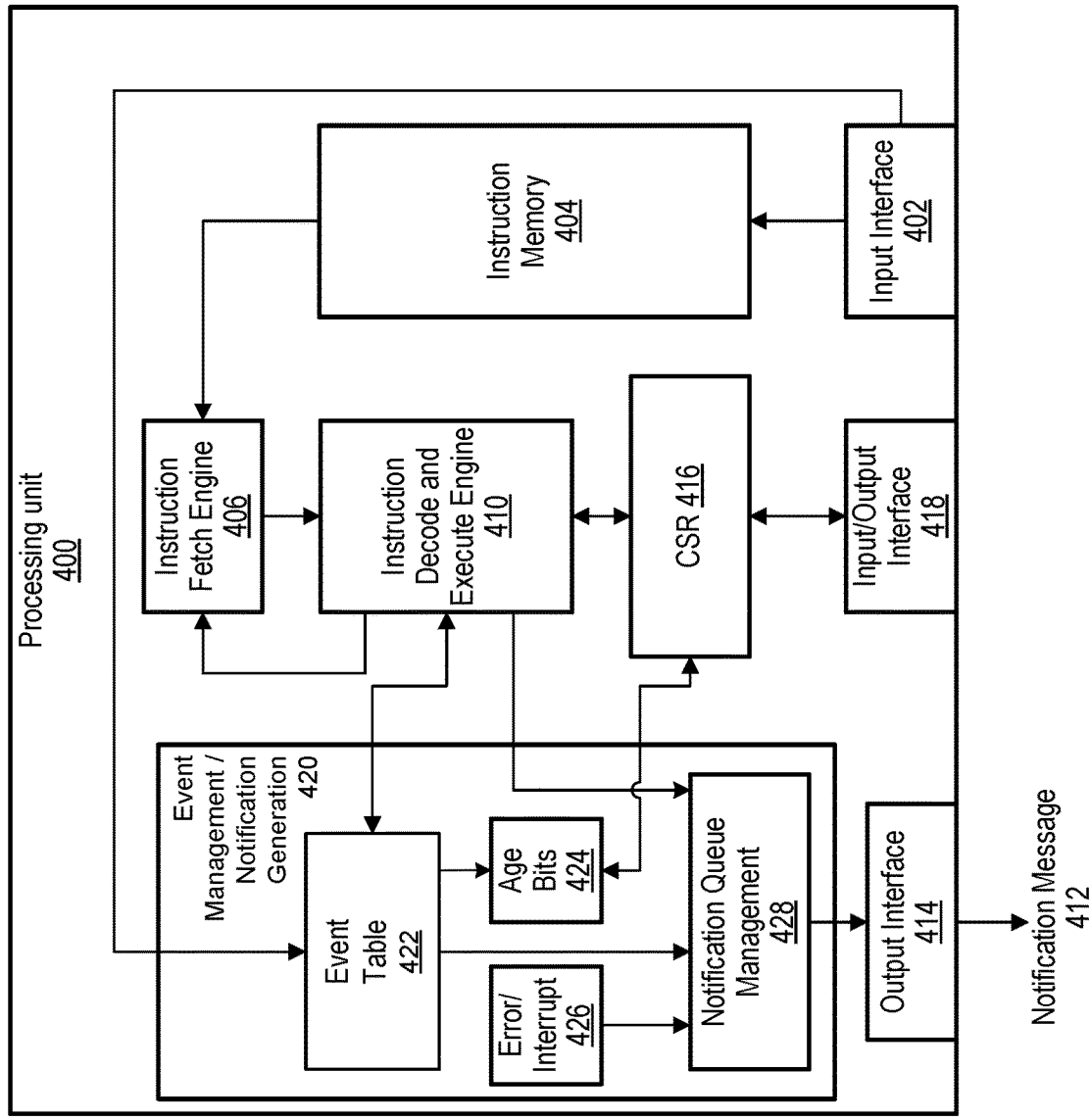
FIG. 4 is a block diagram illustrating an example of a processing unit in a network according to certain embodiments.

FIG. 4 is a block diagram illustrating an example of a processing unit 400 in a network according to certain embodiments. Processing unit 400 may be any one of a support system (e.g., data management processor in support system 112 or coordination processor 230) or an accelerator (e.g., accelerator 202 or a processing engine in accelerator 202). Processing unit 400 is an example of an integrated circuit device that can execute program instructions, and can also be referred to as a processing engine, a data management processor, or a processor. In various embodiments, processing unit 400 may be implemented using one or more integrated circuit devices, such as an Application Specific Integrated Circuit (ASIC), a Field Programmable Gate Array (FPGA) or a similar integrated circuit device. In some examples, processing unit 400 can be incorporated into a larger integrated circuit device. For example, processing unit 400 can be a component in a System on a Chip (SoC).

In the example illustrated in FIG. 4, processing unit 400 includes an input interface 402, an instruction memory 404, an instruction fetch engine 406, an instruction decode and execute engine 410, an event management and notification generation circuit 420, and an output interface 414. Processing unit 400 further includes control and status registers (CSRs) 416 and a combined input/output interface 418 that can provide an alternative interface for exchanging data with other components in the computing system. For example, input/output interface 418 may be used by a host processor to configure processing unit 400 by setting CSRs 416. In some embodiments, input/output interface 418 may include an advanced peripheral bus (APB) interface.

In some embodiments, input interface 402 may provide processing unit 400 with the ability to receive data from other components in the computing system. The data can include program code and other data. For example, a host driver that controls the operation of processing unit 400 may cause program code to be written to processing unit 400 through input interface 402. Input interface 402 can be implemented, for example, as an Advanced Extensible Interface (AXI) slave interface, when the computing system's communication fabric includes an AXI bus structure. In various examples, other bus structures and bus protocols can be used.

In some embodiments, instruction memory 404 may provide processing unit 400 with local storage for the instructions. Instruction memory 404 can be managed by instruction fetch engine 406, which can keep track of free space in instruction memory 404, space that is storing not-yet-executed instructions, and space that is storing instructions that processing unit 400 has already executed. Instruction fetch engine 406 can further keep track of the next instruction that is to be executed, and can fetch this instruction when the instruction decode and execute engine 410 is ready for another instruction, or possibly in advance of the instruction decode and execute engine 410 being ready. In one example, instruction memory 404 may be 64 kilobytes (KB) in size, and may be logically organized with 32-bit words (e.g., each addressable location stores 32 bits). In some examples, instruction memory 404 can be protected using Single-Error Correcting and Double-Error Detecting (SECDED) Error Correcting Code (ECC).

In various embodiments, instruction decode and execute engine 410 may decode instructions read from instruction memory 404 and execute the instructions. The instructions can, for example, cause instruction decode and execute engine 410 to initiate the movement of data from one location in the computing system to another (e.g., from a host memory to an accelerator in the system), wait on a timer, wait on an event, write a notification to a memory location, or trigger an interrupt, among other operations.

One operation that instruction decode and execute engine 410 may perform is waiting on an event or checking whether an event has happened. As described above, an event may be an indicator of an execution status of an operation associated with one or more instructions. For example, an event may be a flag that can be set or cleared to indicate whether an operation is being performed or has been completed. Event management and notification generation circuit 420 may include an event table 422, which may include a register for each respective event in a set of events (e.g., 256 events). An event status change may be indicated by the changing of the status of an event register in event table 422. Event registers in event table 422 may be mapped to memory, and thus may be accessed by other circuits in the system by writing to a memory address through, for example, input interface 402.

Waiting on an event may involve polling an event register associated with the event in event table 422 for a change. The change can be, for example, the setting of (e.g., writing a logic "1" to) the event register, or the clearing of (e.g., writing to a logic "0" to) the event register. When instruction decode and execute engine 410 decodes a wait-for-event instruction, it may wait for the event to be set. While waiting for the event to be set, processing unit 400 may stall and stop executing instructions. When instruction decode and execute engine 410 finds that the event has already been set (e.g., a particular value is already present in the event register), processing unit 400 may proceed to the next instruction. In some embodiments, events may be cleared by processing unit 400. In some embodiments, events may be set or cleared by components external to processing unit 400, such as other integrated circuit devices in the computing system, when, for example, the external component has completed an operation associated with the event. Thus, events can be used to synchronize the execution of processing unit 400 with the execution of other components in the system.

In some embodiments, the events may also be used to determine the execution flow, such as selecting a branch among two or more branches in the program code. For example, processing unit 400 may wait for two or more events and then select a branch in the program code based on which event is set first. Thus, different code may be executed based on the event occurred.

According to certain embodiments, event management and notification generation circuit 420 may also include an age bit register 424, which may include one bit for each respective event in the set of events (e.g., 256 events). In some embodiments, age bit register 424 may be accessible by, for example, the host driver executed by the host processor (e.g., host processor 104), through control and status registers (CSRs) 416 and input/output interface 418. In some embodiments, the age bits may be saved in CSRs 416. Age bit register 424 may be coupled to event table 422, such that a change of value in any event register in event table 422, such as the clearing or setting an event register, may automatically cause a corresponding bit in age bit register 424 to be cleared.

In some embodiments, the host driver may set any age bits corresponding to events that are used for synchronizing and controlling the execution of certain instructions or operations by processing engines on the host system at the start of the execution. For example, the host driver may set some bits in age bit register 424 through control and status registers (CSRs) 416 and input/output interface 418, and then trigger the execution of certain instructions by processing unit 400. Processing unit 400 may execute the instructions, which may include some clear-event instructions or wait-for-event instructions. The clear-event instructions may be executed, which may cause one or more event registers to be cleared (e.g., set to value to "0"), when processing unit 400 triggers an operation by other circuits (e.g., a DMA engine or an accelerator). The wait-for-event instructions may cause processing unit 400 to wait for the completion of operations by other circuits before executing a new instruction. When the other circuits complete the operations, they may write to the memory address mapped to the corresponding one or more event registers that are cleared for the operations by processing unit 400, to set the one or more event registers (i.e., local event registers) associated with processing unit 400, such as writing a value "1" to the event registers. The clearing (e.g., by processing unit 400) and/or the setting (e.g., by other circuits external to processing unit 400) of an event register in event table 422 may cause a change of value in the event register, such as from a value "0" to a value "1" or from a value "1" to a value "0." The change of value in the event register may cause the corresponding age bit in age bit register 424 to be cleared.

Thus, by reading the age bit register at a certain time after setting the bits corresponding to the events for synchronizing and controlling the execution of certain instructions or operations, the host driver may determine whether an event that is expected to have occurred has indeed occurred. As such, if the execution of processing unit 400 has stalled or has caused an error, the host driver may be able to determine the cause of the stall or the error. In some embodiments, the host driver may set some age bits corresponding to events that should not occur during the execution of certain instructions or operations, and read the age bit register after a certain time period to determine if any event that should not have occurred has actually occurred.

In some embodiments, a change in the value of any event register in event table 422 can cause processing unit 400 to send a notification message. The notification message may be generated by a notification queue management 428 in event management and notification generation circuit 420. For example, when an event register is set, notification queue management 428 may determine to send a notification message 412 that identifies the event and indicates that the event has been set. In various embodiments, notification queue management 428 can also send a notification message when the event register is cleared. In some examples, notification queue management 428 can also generate a notification message 412 when an event is set twice or cleared twice. In these examples, notification message 412 can indicate that the event was set or cleared twice, which might be an erroneous behavior, and thus should be identified. In these and other embodiments, notification message 412 can provide information about when synchronization events occurred and/or when processing unit 400 encountered a synchronization event.

In various embodiments, whether notification queue management 428 generates a notification message 412 when the status of an event register changes can be enabled or disabled. For example, CSRs 416 can include a register for each event that indicates whether a change to the register for the event should cause a notification message 412 to be generated.

In some embodiments, notifications for different event registers can be written to the same queue in processor memory or in different queues. For example, CSRs 416 can include one set of registers (e.g., for information such as a base address, a head pointer, and a tail pointer) for one queue in the processor memory. In various examples, the number of queues used can be configured by the host driver that controls processing unit 400.

Other conditions may also be detected and the errors or interruptions generation block 426 may cause a notification message to be sent for each such condition. In some cases, the detected condition may be non-fatal and can be used to provide information related to the internal operation of processing unit 400, which can be used by a host processor (e.g., host processor 104) to analyze performance, debug, or reconfigure certain features of processing unit 400. For example, a forward branch error or a backward branch error may inform the host processor of the operational flow of the processing unit 400. In another example, a correctable ECC error or a non-correctable ECC error may be used by the host processor to monitor the performance of the memory. For example, the host processor can track occurrences of the ECC conditions over a period of time to determine that a certain portion or all of the memory is starting to fail so that the memory can be reconfigured or replaced.

A halt signal generated by processing unit 400 upon detecting a condition may be used to stop processing unit 400 from executing instructions. For example, in some instances, processing unit 400 may encounter an invalid instruction which processing unit 400 may be unable to decode. In such instances, it may be desirable to halt processing unit 400 so that the instruction can be corrected or skipped, and processing unit 400 can resume normal operation. In some embodiments, an interrupt signal may be generated with the halt signal to notify the host processor of the condition and/or that processing unit 400 is halted. The host processor may resolve the condition upon receiving the interrupt signal.

Errors can occur due to a problem in the operation of the hardware of processing unit 400, due to misconfiguration of processing unit 400, because of problems in the instructions, and/or due to processing unit 400 receiving problematic instructions from other components in the computing system, among other examples. The errors can be detected, for example, by instruction decode and execute engine 410, such as when instruction decode and execute engine 410 encounters an instruction that cannot be decoded or contains invalid fields, among other examples. The errors can, alternatively or additionally, be detected by instruction fetch engine 406, for example, when instruction fetch engine 406 receives an improperly formatted write transaction for instruction memory 404. The errors can also, alternatively or additionally, be detected by notification queue management 428, such as when a notification queue becomes full or notification queue management 428 is told to generate a notification for which no queue has been configured, among other examples.

In some embodiments, notification queue management 428 may also generate a notification message 412 upon the instruction decode and execute engine 410 decoding an explicit instruction for generating a notification. This type of notifications is referred to herein as an explicit notification. The notification instruction can enable instructions to output notifications at any point during the execution of the instructions. The notification instruction can, thus, be used to indicate that a certain set of instructions have been executed for a count of iterations of a loop in the code, among other examples. The explicit notification can provide similar information as a print statement in the instructions, without the overhead of having to conduct I/O operations.

In some examples, the generation of explicit notifications can also be enabled or disabled through registers in CSRs 416. For example, CSRs 416 can include a register that, if set, disables or enables all explicit notifications. As another example, CSRs 416 can include one or more registers that can identify explicit notifications that are enabled or disabled. The explicit notifications can be identified, for example, by a token or counter identifier indicated by the instruction that triggers generation of the notification.

In addition to generating notifications, notification queue management 428 can perform other management operations for the notifications. For example, notification queue management 428 can include a timestamp generator, from which each notification can obtain a timestamp. In this and other examples, the notifications can each obtain a timestamp from the same source (such as a clock counter), so that the notifications can be correlated to one another based on the timestamps. Additionally, for example, when multiple errors occur concurrently (e.g., in the same clock cycle), or errors occur concurrently with a change of status of an event or an explicit notification, or notification queue management 428 otherwise receives simultaneous requests to generate notifications, notification queue management 428 can apply the same timestamp to each notification generated. That is, notification queue management 428 need not queue simultaneous notification requests, and can instead handle each request at the same time (e.g., within the same clock cycle). By applying the same timestamp to concurrently occurring notifications, the notifications can indicate different things that occurred in processing unit 400 at the same time.

In various examples, when a computing system includes more than one accelerator, timestamp generators in the multiple accelerators can be synchronized, for example, by being started on the same value (e.g., at zero) at the same time. For example, the accelerators can be made to exit reset in the same clock cycle, or may wait for an explicit signal before starting the timestamp generators. In some examples, the accelerators may further periodically be synchronized, for example, by receiving an updated value for the timestamp, from which each accelerator can subsequently start counting. In some embodiments, the accelerators may use a same reference clock.

Notification queue management 428 can further keep track of the notification queues in the processor memory (and/or another external memory). For example, CSRs 416 can include registers that store information such as a base address and size for each queue, as well as the current head pointer location and tail pointer location for each queue. In this example, notification queue management 428 can update the tail pointer of a queue upon sending a notification message 412 to the queue. Notification queue management 428 can, for example, cause a transaction to be sent, either through output interface 414 or the combined input/output interface 418, that indicates the update to the tail pointer. As another example, notification queue management 428 can check whether queues are full by examining the head and tail pointers of the queues.

In various examples, notification queue management 428 can further include a physical queue for storing outgoing notifications. A hardware queue can enable notification queue management 428 to store notifications that are generated concurrently (e.g., in the same clock cycle), for example. The hardware queue can also enable notification queue management 428 to store notifications when output interface 414 is being used to output other data. In these and other examples, additional errors that notification queue management 428 can detect include the hardware queue being full when notification queue management 428 has more notifications to generate.

In various examples, output interface 414 provides processing unit 400 with an interface through which processing unit 400 can output data to other components in the computing system. Output interface 414 can, for example, connect to a communication fabric in the computing system. Output interface 414 can be implemented, for example, as an AXI master interface, for connecting to an AXI bus structure. In various examples, other bus structures and bus protocols can be used.

In addition to storing information for the notification queues, in various examples, CSRs 416 may enable certain operations of processing unit 400 to be modified when processing unit 400 is in operation, and/or can provide a place from which information about processing unit 400 can be read. For example, CSRs 416 can include registers for enabling or disabling interrupts that can be generated from processing unit 400. CSRs 416 can further include, for example, registers from which a current execution state, current timestamp, statistics, or other data can be read.

In various examples, CSRs 416 can be read from and written to through a combined input/output interface 418. The combined input/output interface 418 can provide processing unit 400 with an alternate communication path to other components in the system. This path can be slower than the paths used by input interface 402 and output interface 414, or may provide a more direct connection to the primary processor. In some examples, the combined input/output interface 418 is optional, and processing unit 400 receives transactions for CSRs 416 at input interface 402, and sends data from CSRs 416 out through output interface 414.

In some embodiments, multiple processing units in a computing system may each include a notification queue management block, such as notification queue management 428, event registers (such as event registers in event table 422), and one or more age bit registers (such as age bit register 424). The notification queue management blocks in the processing units may generate notification messages based on a same clock source or clock counter and send the notification messages to the same queue in a host memory, such as host memory 106. The event registers may be set or cleared internally or externally by other circuits or processing units.

In some embodiments, to determine if the execution of instructions by the processing engines is performed properly, the host processor may poll the age bit registers through CSRs 416 to determine if events that are expected to occur have occurred and whether events that are not expected to occur have occurred. If an event that is expected to occur has not occurred or if an event that is not expected to occur has occurred, an error (e.g., a stall) may have occurred during the execution of the instructions.

In some embodiments, after an error is detected, the host processor may read the corresponding event register in event table 422 or the corresponding notification messages saved in the host memory, which may include more information (e.g., timestamps and whether the event is cleared or set) that can be used to determine the root cause of the missing of the expected event or the occurring of the unexpected event. In this way, the host processor may only need to read one or a few registers (which may indicate if there is a state change in any event register of the event registers), rather than reading all event registers, to determine if the execution is performed as desired. If the execution is performed as desired, the host processor may not need to read individual event registers or notification messages. If an event is missing or an unexpected event has occurred, the host processor may only need to read the corresponding event register or related notification messages to determine the root cause.

Figure 5:
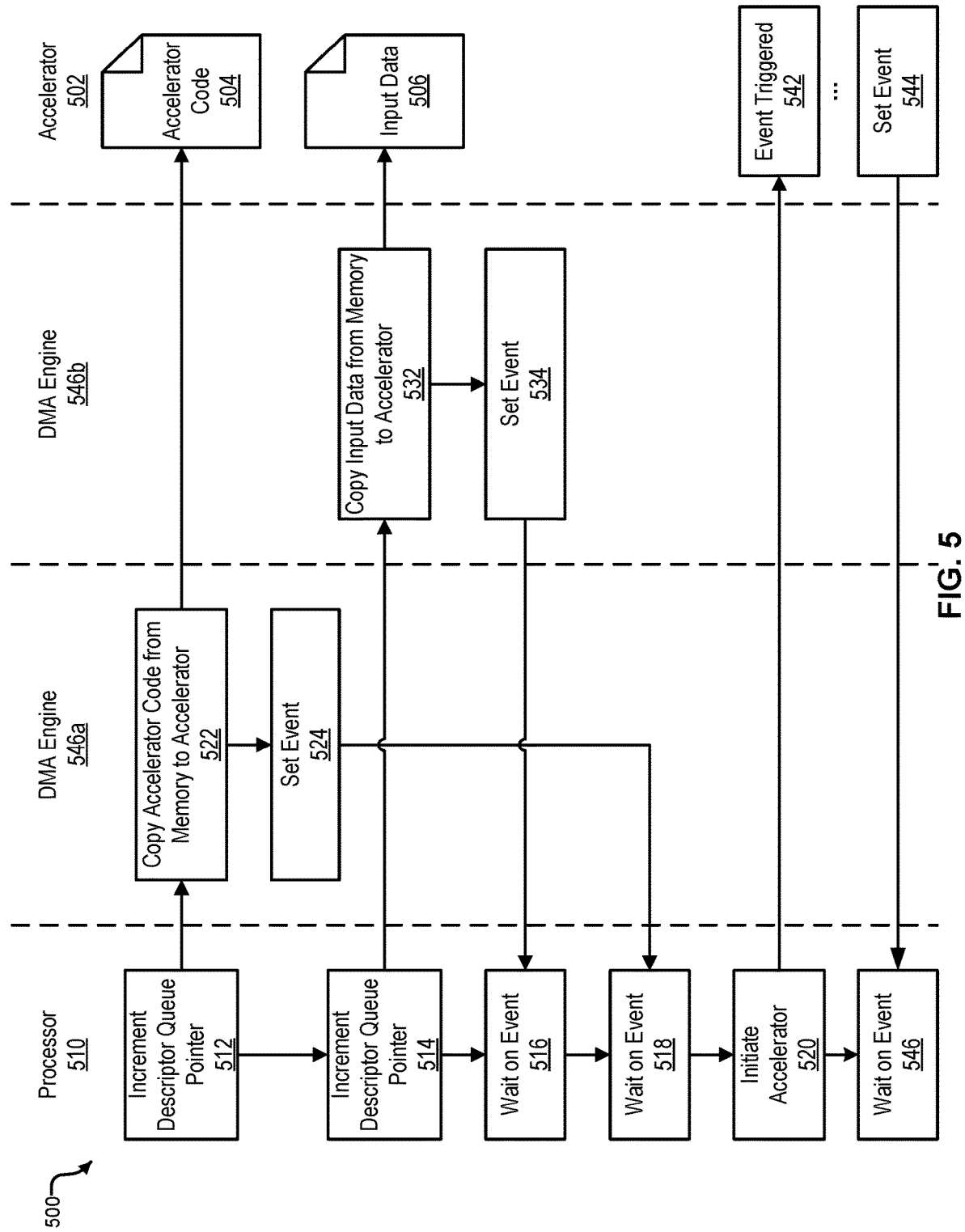
FIG. 5 includes a flow diagram illustrating an example of program code for a network according to certain embodiments.

FIG. 5 includes a flow diagram illustrating an example of program code 500 for a network according to certain embodiments. FIG. 5 shows a processor 510 (such as a data management processor or coordination processor 230), two DMA engines, an accelerator 502, and the actions triggered when the processor, accelerator, and DMA engines execute instructions in the program code. Program code 500 in this example sets up accelerator 502 to perform a computation on a set of input data 506. The computation can be, for example, execution of a neural network, rendering of graphics, or floating point calculations, among other computations. Processor 510 can begin executing the program code when processor 510 finds that a head pointer for the processor's instruction memory is not pointing to a same address as the address pointed to by the tail pointer.

Step 512 illustrates a first instruction, in which processor 510 increments a descriptor queue pointer for a first DMA engine 546a. Descriptors may have been added to the first DMA engine's descriptor queue in advance, for example, by a host driver. To increment the descriptor queue pointer, processor 510 can, for example, write a command to first DMA engine 546a that instructs first DMA engine 546a to increment a pointer for the first DMA engine's descriptor queue by a certain number of entries. In some embodiments, processor 510 may clear an event register for a first event before or after executing the first instruction. In various examples, processor 510 does not wait for or expect a reply to this command, and instead moves on to the next instruction at step 514.

In the meantime, first DMA engine 546a may, at step 522, execute a descriptor in the descriptor queue of first DMA engine 546a. In this example, executing the descriptor causes first DMA engine 546a to copy accelerator code 504 from a memory location where accelerator code 504 is stored to a memory location in accelerator 502. In various examples, accelerator code 504 provides instructions, and possibly also data, that accelerator 502 can use to perform a computation or a series of computations. In some examples, the copy operation of step 522 can involve two memory descriptors, a first that informs first DMA engine 546a where to read accelerator code 504 and a second that informs first DMA engine 546a where to write accelerator code 504. In these examples, the instruction at step 512 can include incrementing the descriptor queue pointer by two entries. The increment value first DMA engine 546a receives from the instruction at step 512 can act as a counter, and first DMA engine 546a can execute a descriptor for each count until the number of descriptors executed equals the count.

In various examples, the descriptor queue of first DMA engine 546a can also include a descriptor that causes first DMA engine 546a to set the event register for the first event in processor 510 at step 524. In various examples, step 524 is not executed until the copying of accelerator code 504 at step 522 completes. Setting the event at step 524 can inform processor 510 that copying of accelerator code 504 has completed. As described above, an event can be represented in processor 510 by a register or a mapped memory address to which other components, such as DMA engines and accelerators, can write. At step 524, for example, first DMA engine 546a can execute a descriptor that includes a write to the event register or memory location for the first event.

At step 514, processor 510 executes a second instruction, which causes processor 510 to increment the descriptor queue pointer for a second DMA engine 546b. To increment the descriptor queue pointer for second DMA engine 546b, processor 510 can, for example, send a command to second DMA engine 546b that instructs second DMA engine 546b to increment a descriptor queue pointer by a certain number of entries. In some embodiments, processor 510 may clear an event register for a second event before or after executing the second instruction. In various examples, processor 510 does not expect or wait for a response to this command, and instead proceeds to the next instruction.

At step 532, having been instructed to execute a number of descriptors, second DMA engine 546b can sequentially execute the descriptors. In the example shown in FIG. 5, the descriptors cause second DMA engine 546b to copy input data 506 from a memory location where input data 506 is stored to a memory location in accelerator 502. Input data 506 can be data on which accelerator 502 performs the computation programmed by accelerator code 504, and for which a result is desired. In some examples, copying input data 506 involves two descriptors, one descriptor that causes second DMA engine 546b to read input data 506 from the storage location and a second that causes second DMA engine 546b to write input data 506 to accelerator 502.

After executing the copy operation at step 532, second DMA engine 546b sets the event register for the second event in processor 510 at step 534. Setting the event register can include, for example, transmitting a write transaction, with a particular address, to processor 510. In various examples, second DMA engine 546b executes step 534 only after the copy operation of step 532 completes, so that the event informs processor 510 that copying of input data 506 has finished. In some examples, the write transaction can be initiated by a descriptor in the descriptor queue of second DMA engine 546b that processor 510 instructs second DMA engine 546b to execute.

As noted above, processor 510 can execute the instructions at steps 512 and 514 without waiting for a reply or acknowledgment from either first DMA engine 546a or second DMA engine 546b. Processor 510 can thus proceed to step 516, at which processor 510 decodes and executes an instruction to wait for an event. Waiting for an event can include, for example, monitoring a particular event register or memory location for a write to the event register or memory location. As described above, processor 510 may have a number of event registers or address locations that each represent a different event. In some embodiments, for an event to occur, a particular value may need to be written to the register or memory location. For example, a value of "1" can indicate that the event has been set, while a value of "0" indicates that the event has been cleared or has not been set. Alternatively or additionally, in some examples, any value can be written to the register or memory location to indicate that the event has occurred.

In the example shown in FIG. 5, processor 510 waits for the second event to occur at step 516. In this example, the second event is set by second DMA engine 546b, and setting of the second event by second DMA engine 546b may occur at some time after processor 510 executes the instruction at step 516. Processor 510 may thus wait and execute no further instructions until receiving an indication that the second event is set. Upon receiving this indication, processor 510 can proceed to step 518.

At step 518, processor 510 decodes and executes an instruction to wait on the first event. In various examples, processor 510 can distinguish the second event from the first event based on the identifiers associated with the events, an address for each event, or some other encoding for the events. In the example of FIG. 5, the first event is set by first DMA engine 546a. Setting the first event by first DMA engine 546a may have occurred before setting of the second event by second DMA engine 546b. For example, first DMA engine 546a may have a smaller amount of data to move than second DMA engine 546b. When processor 510 encounters the instruction to wait on the first event, processor 510 may find that the first event has already been set, and may thus proceed to the next instruction. The order of steps 516 and 518 in FIG. 5 is provided as an example. In other examples, these steps can be reversed, with the same outcome (e.g., processor 510 waits for the copy operations of both step 522 and step 532 to complete before proceeding) occurring.

At step 520, processor 510 may decode and execute an instruction to initiate accelerator 502. This instruction can, for example, cause processor 510 to send a write transaction to accelerator 502, which may set an event (e.g., writing "1" to an event register) at accelerator 502. Processor 510 may then proceed to execute a wait for event instruction at step 546. In some embodiments, processor 510 may clear an event register for a third event associated with processor 510 before or after initiating accelerator 502 at step 520.

Accelerator 502 can operate using events in a similar fashion as processor 510. For example, accelerator 502 may be able to watch particular event registers or memory addresses associated with accelerator 502 for values to be written to these event registers or memory locations before executing certain instructions. In the example shown in FIG. 5, at step 542, accelerator 502 can determine that an event it is waiting for has been set, and may then begin to execute accelerator code 504 using input data 506.

At step 544, after executing accelerator code 504, accelerator 502 may set an event register associated with processor 510. Processor 510, upon detecting that the event it is waiting for has been set, may then proceed to execute the subsequent instructions.

In various examples, program code 500 can include additional steps that are similar to the steps illustrated in FIG. 5. For example, accelerator code 504 may include stages, such that program code 500 may include instructions to successively load each stage into accelerator 502. These instructions can take the form of additional instructions to increment descriptor queues.

In various examples, program code 500 can also include instructions for copying a result computed by accelerator 502 to a memory location, such as in the host memory. In these examples, program code 500 can include instructions to increment additional descriptor queue pointers, which cause a DMA engine to read data from accelerator 502 and write the data into a memory location.

In the example of FIG. 5, program code 500 makes use of two DMA engines and one accelerator. In other examples, program code can make use of one DMA engine and one accelerator, one DMA engine and multiple accelerators, or multiple DMA engines and multiple accelerators. In each of these cases, the number and identities of the DMA engines and the accelerators may be encoded in the instructions of the program code.

As described above with respect to, for example, FIG. 4, a host processor or host driver may set age bits (e.g., in or associated with processor 510 and accelerator 502) associated with events to be tracked for program code 500 before program code 500 is executed. During execution of program code 500, when any event register for an event changes status, for example, from being set to being cleared or from being cleared to being set, a corresponding age bit for the event may be cleared. The host driver can thus track and debug the execution of program code 500 by reading the age bit register. In addition, when any event register is set or cleared, a notification message may be generated and saved to the host memory.

Figure 6:
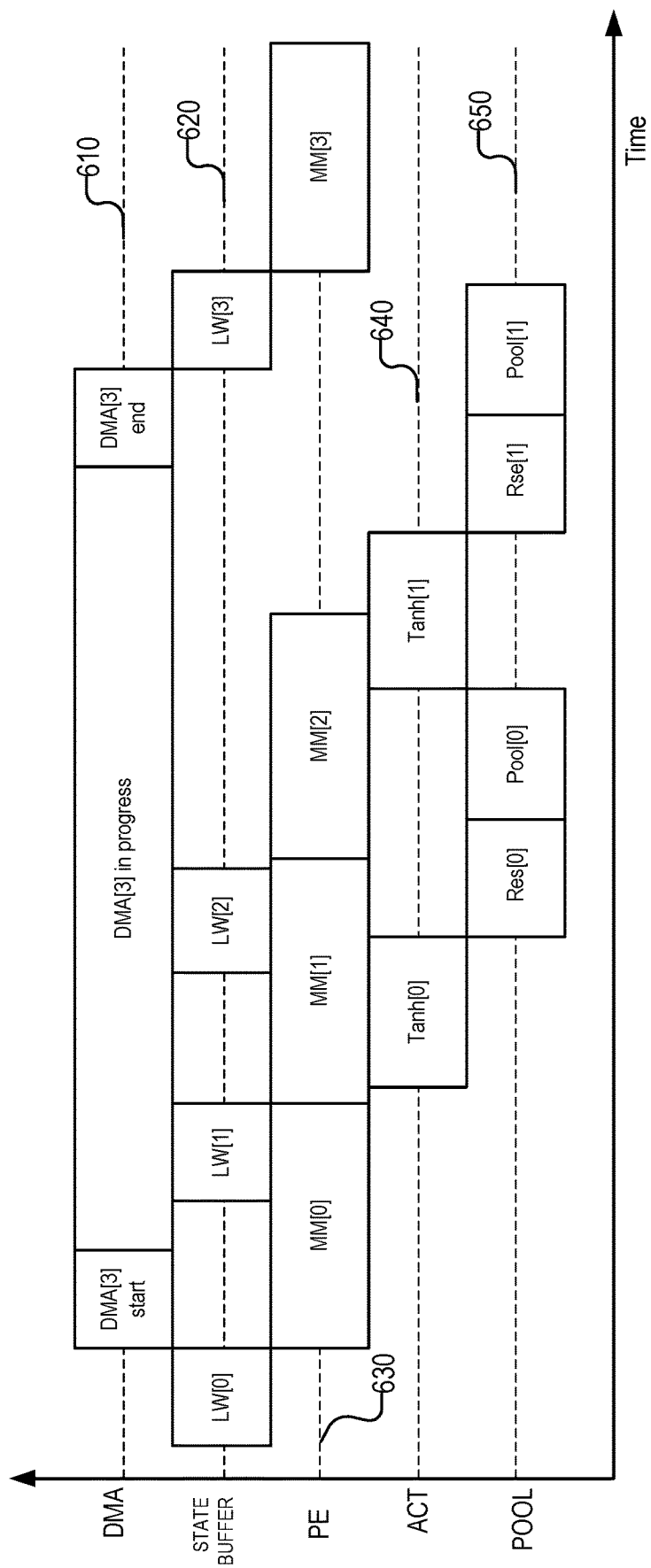
FIG. 6 illustrates examples of execution timelines of various functional blocks of a network synchronized using events according to certain embodiments.

FIG. 6 illustrates examples of execution timelines of various functional blocks of a network synchronized using events according to certain embodiments. In some embodiments, the execution timelines shown in FIG. 6 may be determined by the compiler when compiling a network model. In some embodiments, the execution timelines shown in FIG. 6 may be determined by the host processor or other processors based on the notification messages saved in the host memory as described above. In the example shown in FIG. 6, the operations of a DMA controller of the neural network may be shown by a timeline 610, which may indicate the DMA start time (e.g., start time of DMA[3]), the data transfer time (e.g., data transfer time of DMA[3]), and the DMA finish time (e.g., end time of DMA[3]). The loading of the weights for the neural network layers to a state buffer may be shown by a timeline 620, which indicates the starting time and the end time for loading the weights for the network layers, such as an operation LW[0] for loading the weights for a set of a convolution layer, an activation layer, and/or a pooling layer. The operations of a PE array may be shown by a timeline 630, which may indicate the starting time and the end time of each convolution operation, such as matrix multiplication MM[0], MM[1], MM[2], or MM[3]. The operations of an activation engine may be shown by a timeline 640, which may indicate the starting time and the end time of each activation operation, such as activation operation Tanh[0] or Tanh[1]. The operations of an pooling engine may be shown by a timeline 650, which may indicate the starting time and the end time of each residual operation, such as activation operation Tanh[0] or Tanh[1], and the starting time and the end time of each pooling operation, such as pooling operation Pool[0] or Pool[1].

Figure 7:
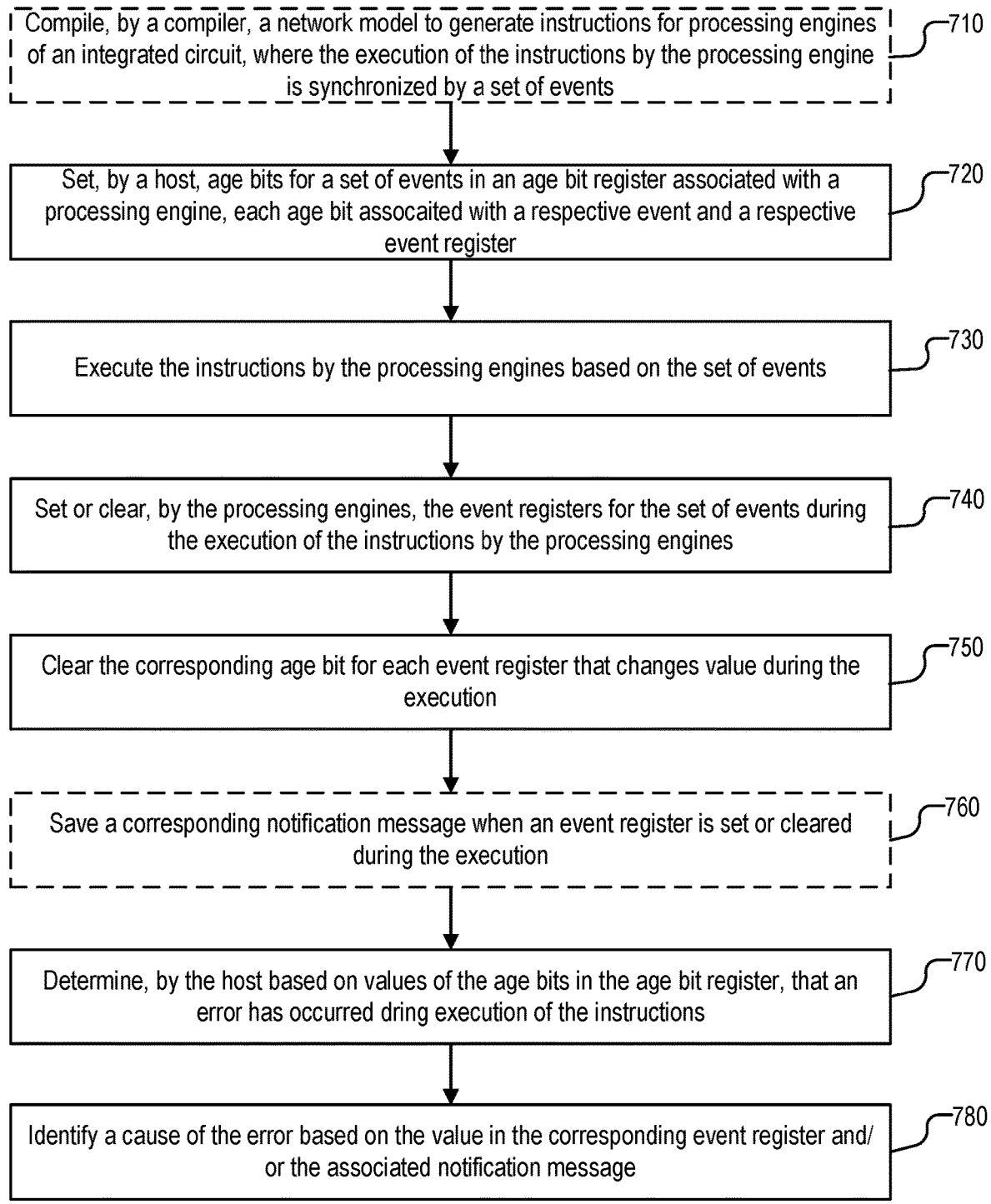
FIG. 7 is a simplified flow chart illustrating an example method for tracking the execution of a network according to certain embodiments.

FIG. 7 is a simplified flow chart 700 illustrating an example method for synchronizing and tracking the execution of a network according to certain embodiments. The method may be implemented by the systems described above with respect to, for example, FIGS. 1, 2, and 4. Even though FIG. 7 describes the example method as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the method may be implemented in hardware, software, firmware, middleware, microcode, hardware description languages, or any combination thereof.

Optionally, at block 710, a compiler may compile a network model to generate instructions for processing engines of an integrated circuit, where the execution of the instructions by the processing engine may be synchronized by a set of events. The processing engines may include, for example, a coordination processor, a convolution engine, an activation engine, a pooling engine, or a DMA engine. In some embodiments, the processing engines of the neural network may execute respective sets of instructions in multiple threads as described above. The compiling may include, for example, determining the processing engine used to perform an operation (e.g., convolution, polling, activation, multiplication, etc.), determining memory locations for storing various data for the neural network (e.g., input data to the neural network and parameters of the neural network, such as weights or filter parameters), determining the order of operations by different processing engines, determining the relative timing of the operations, and determining events to be used to enforce the relative timing or the order of the operations by the different processing engines. For example, as described above, in some embodiments, instructions for clearing an event when an operation is triggered, instructions for setting an event after the completion of an operation, and/or instructions to wait for an event before starting an instruction, and the like, may be added by the compiler to enforce the order of operation when needed. The executable instructions may be stored in a memory device and may be sent to corresponding instruction buffers, for example, through DMA data movement, for executing by the processing engines.

At block 720, a host processor may set age bits for a set of events to be monitored. The age bits may be in one or more age bit registers, where each bit in the one or more age bit registers corresponds to a respective event and a respective event register. The one or more age bit registers may be associated with or included in a processing engine. As described above, each processing engine, such as coordination processor 230 or accelerator 202, may maintain its own set of local event registers and age bit registers. The local event registers may be memory mapped and thus may be accessed by other circuits based on the mapped memory addresses. In some embodiments, the age bit registers may be included in CSRs. The host processor may set the age bits associated with one or more processing engines by, for example, writing "1s" to the age bits. In some embodiments, the host processor may set the age bits associated with a processing engine through an APB interface and/or CSRs. In some embodiments, the set of events to be monitored may include events that are expected to be set or cleared. In some embodiments, the set of events to be monitored may include events that are not expected to be set or cleared.

At block 730, the processing engines may execute the instructions based on the set of events. Each processing engine may be configured to execute a subset of the executable instructions. In some embodiments, the processing engines may be coordinated based on events as described above with respect to, for example, FIGS. 2-5. For example, a coordination processor or a data management processor may trigger a DMA data movement to an accelerator and wait for an event indicating that the DMA data movement is complete before triggering the accelerator to execute. In another example, an activation engine may be controlled to wait for an event indicating the completion of an instruction by a convolution engine to be set before starting an activation operation that uses the output of the convolution engine.

At block 740, the processing engines may set or clear the event registers for the set of events during the execution of the instructions by the processing engines. For example, a first processing engine may clear a local event register associated with or included in the first processing engine when triggering an operation by a second processing engine, and wait for the local event register to be set before executing subsequent instructions. The second processing engine may perform the operation, and upon completion of the operation, remotely set the event register associated with the first processing engine, for example, by writing to a memory location mapped to the event register. In some embodiments, a processing engine may clear a first event register corresponding to a first event, clear a second event register corresponding to a second event, wait for the first event register or the second event to be set, and then determine a next instruction to execute based on, for example, which event register is set first and/or whether both event registers are set.

At block 750, for each event register that changes value during the execution, such as changing from being set to being cleared or changing from being cleared to being set, the corresponding age bit may be automatically cleared, such as being setting to "0." In some embodiments, the age bit register may be configured such that an age bit that has been set may only be cleared after the corresponding event register is set (e.g., after a logic "1" is written to the corresponding event register). In some embodiments, the age bit register may be configured such that an age bit that has been set may only be cleared after the corresponding event register is cleared (e.g., after a logic "0" is written to the corresponding event register).

Optionally, at block 760, a corresponding notification message may be generated when an event register is set or cleared during the execution. The notification message may include an identification of the corresponding event and a timestamp associated with the event as described above. As also described above, during execution of the instructions by the processing engines of the integrated circuit, the current operational state of the hardware may also be tracked. For example, if an error, a halt, or an interrupt has occurred, a notification message may also be generated. The notification message may be saved to a memory accessible by a processor, such as the host memory, as described above.

At block 770, the host processor may read age bit registers associated with or included in one or more processing engines to determine whether an expected event has not occurred or whether an event that should not occur has occurred. In some embodiments, the host processor may read the age bit register periodically. In some embodiments, the host register processor may read the age bit register at a time when the execution is expected to have completed. In some embodiments, the host register processor may read the age bit register at a time when an error or stall is known to have occurred. If an expected event has not occurred or an event that should not occur has occurred, an error (e.g., a stall) may have occurred during the execution of the instructions by the processing engines. If the execution is performed as expected, the host processor may not need to read individual event registers or notification messages. In some embodiments, the host processor may read the age bit registers through CSRs.

At block 780, upon determining that an error may have occurred during the execution, the host processor may read the corresponding event registers and/or the saved notification messages to determine the root cause of the missing of the expected event or the occurring of the unexpected event. For example, based on the timestamps in the notification messages, the time that the error occurred and/or the corresponding instruction or operation may be determined. A correction action, such as modifying the network model, may then be taken to avoid the error in future execution.

Figure 8:
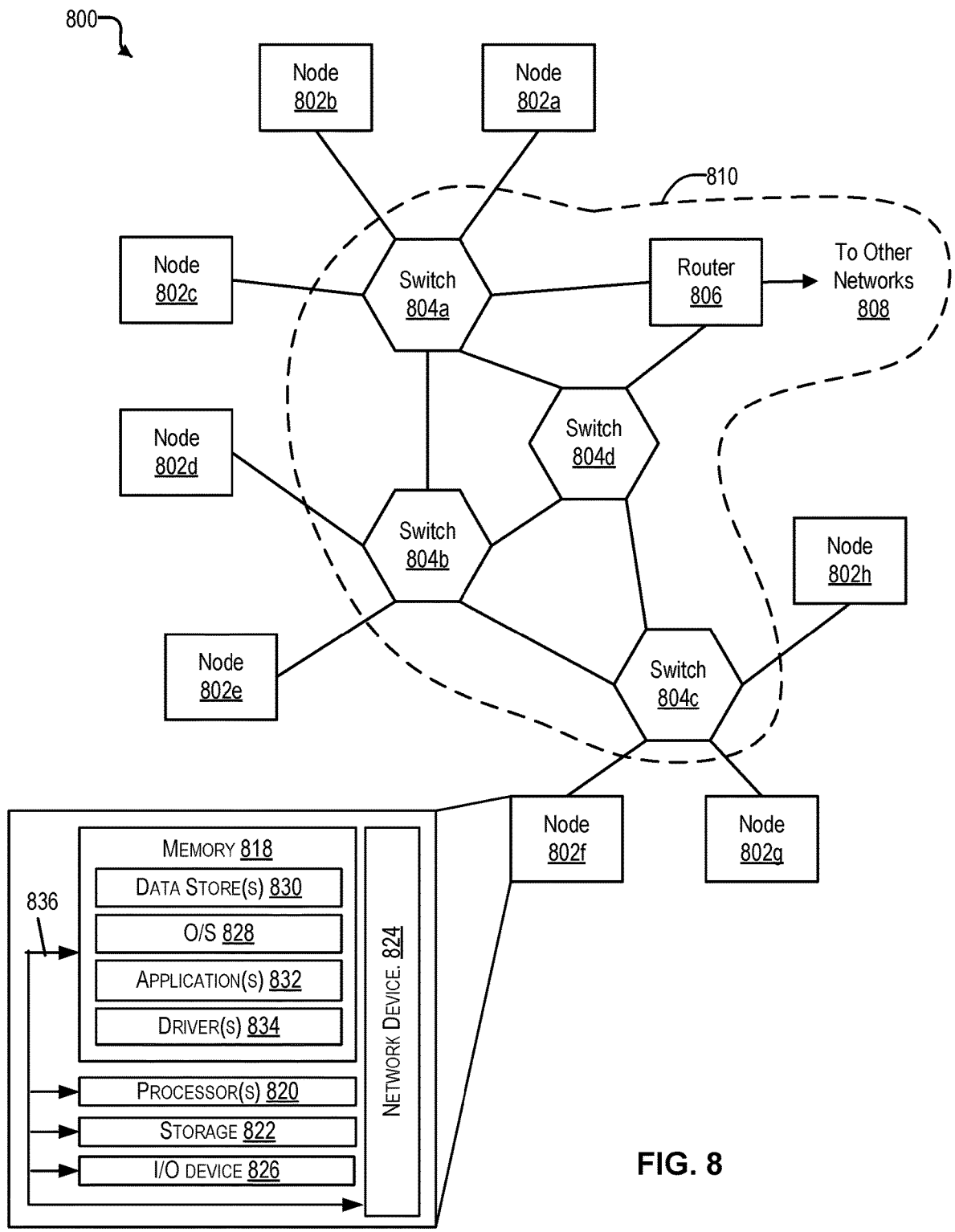
FIG. 8 illustrates an example architecture for features and systems described herein that includes one or more service provider computers and/or a user device connected via one or more networks, according to certain embodiments.

FIG. 8 illustrates a network 800, illustrating various different types of network devices, such as nodes comprising the network device, switches and routers. In certain embodiments, the network 800 may be based on a switched architecture with point-to-point links. As illustrated in FIG. 8, the network 800 includes a plurality of switches 804*a*-804*d*, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804*a*-804*d* may be connected to a plurality of nodes 802*a*-802*h* and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804*a*-804*d* and router 806, if present, may be referred to as a switch fabric, a fabric, a network fabric, or simply a network. In the context of a computer network, terms "fabric" and "network" may be used interchangeably herein.

Nodes 802*a*-802*h* may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s)

to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802*a*-802*h* may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more applications 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, applications 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between applications 832 and the operating system 828, and/or applications 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
generating, by a compiler and based on a model of a neural network, executable instructions to be executed by processing engines in an integrated circuit to implement the neural network;
setting, by a host computer, age bits in a first age bit register associated with a first processing engine, each age bit in the first age bit register corresponding to a respective event in a first set of events;
executing, by the processing engines, the executable instructions, wherein:
executing the executable instructions by the processing engines is synchronized using the first set of events; and
executing the executable instructions by the processing engines causes the processing engines to set or clear event registers for the first set of events, each event register for the first set of events being associated with the first processing engine and corresponding to a respective event in the first set of events and a respective age bit in the first age bit register;
based on a change of value in an event register for the first set of events during executing the executable instructions by the processing engines, clearing the corresponding age bit in the first age bit register;
determining, by the host computer and based on values of the age bits in the first age bit register, that an error has occurred during executing the executable instructions by the processing engines; and
identifying a cause of the error based on values in the event registers for the first set of events.

2. The method of claim 1, wherein:
the first processing engine is configured to clear an event register associated with the first processing engine before triggering a second processing engine to perform an operation; and
the second processing engine is configured to set the event register associated with the first processing engine after performing the operation.

3. The method of claim 1, further comprising:
generating, by the first processing engine, a notification message when an event register associated with the first processing engine is set or cleared.

4. The method of claim 1, further comprising setting, by the host computer, age bits in a second age bit register associated with a second processing engine, wherein:
each age bit in the second age bit register is associated with a respective event in a second set of events;
executing the executable instructions by the processing engines is further synchronized using the second set of events;
executing the executable instructions by the processing engines causes the processing engines to set or clear event registers for the second set of events, each event register for the second set of events associated with the second processing engine and corresponding to a respective event in the second set of events and a respective age bit in the second age bit register;
a corresponding age bit in the second age bit register is cleared when an event register for the second set of events changes values during executing the executable instructions by the processing engines; and
determining that the error has occurred during executing the executable instructions by the processing engines is further based on values of the age bits in the second age bit register.

5. An integrated circuit comprising:
a first processing engine configured to execute instructions synchronized using a first set of events;
a first set of event registers associated with the first processing engine, each event in the first set of events corresponding to a respective event register in the first set of event registers;
a first age bit register associated with the first processing engine, the first age bit register including a first set of age bits, each age bit corresponding to a respective event register in the first set of event registers; and
an interface for accessing the first age bit register,
wherein each age bit in the first age bit register is configured to be set by an external circuit through the interface;
wherein each age bit in the first age bit register is configurable to be cleared in response to a value change in a corresponding event register in the first set of event registers; and
wherein executing the instructions by the first processing engine changes a value of an event register in the first set of event registers.

6. The integrated circuit of claim 5, wherein the first set of event registers is mapped to a set of memory locations accessible by an external processing engine.

7. The integrated circuit of claim 5, wherein each age bit in the first age bit register is configurable to be cleared only when the corresponding event register in the first set of event registers is set or only when the corresponding event register in the first set of event registers is cleared.

8. The integrated circuit of claim 5, wherein the first processing engine is configured to:
   clear an event register in the first set of event registers when executing of an instruction; and
   wait for the event register to be set.

9. The integrated circuit of claim 8, further comprising a second processing engine, wherein executing the instruction by the first processing engine triggers the second processing engine to:
   perform an operation; and
   set the event register after performing the operation.

10. The integrated circuit of claim 9, wherein:
    the second processing engine is configured to execute instructions that are synchronized using a second set of events; and
    the integrated circuit further comprises:
        a second set of event registers associated with the second processing engine, each event in the second set of events corresponding to a respective event register in the second set of event registers; and
        a second age bit register associated with the second processing engine, the second age bit register including a second set of age bits, each age bit in the second set of age bits corresponding to a respective event register in the second set of event registers,
        wherein each age bit in the second age bit register is configured to be set by the external circuit; and
        wherein each age bit in the second age bit register is configurable to be cleared in response to a value change in a corresponding event register in the second set of event registers.

11. The integrated circuit of claim 5, wherein the external circuit includes a host processor.

12. The integrated circuit of claim 5, wherein the first age bit register is accessible through the interface and a control and status register (CSR).

13. The integrated circuit of claim 5, further comprising an event notification circuit, wherein the event notification circuit is configured to:
    detect the value change in the corresponding event register in the first set of event registers;
    generate a notification message including an identification of an event corresponding to the event register and a timestamp indicating a time when the value change occurs; and
    save the notification message to a memory device.

14. The integrated circuit of claim 5, wherein the first processing engine is configured to execute the instructions to implement a neural network.

15. A method comprising:
    setting, by a processing circuit and based on an instruction from an external circuit, a first age bit from a set of age bits in an age bit register associated with the processing circuit, each age bit in the set of age bits corresponding to a respective event register in a set of event registers associated with the processing circuit, and a value in each event register in the set of event registers indicating a state of a respective event in a set of events;
    executing instructions by the processing circuit based on states of the set of events;
    setting or clearing an event register corresponding to the first age bit based on the executing; and
    clearing the first age bit based on a value change in the event register corresponding to the first age bit.

16. The method of claim 15, further comprising:
    reading the age bit register;
    determining that the first age bit is cleared or is not cleared due to an error that occurred during executing the instructions; and
    identifying a cause of the error based on a value in the event register corresponding to the first age bit.

17. The method of claim 15, wherein setting or clearing the event register corresponding to the first age bit based on the executing comprises:
    clearing the event register by the processing circuit; and
    setting the event register based on an instruction sent by a second processing circuit after the second processing circuit completing an operation.

18. The method of claim 15, wherein the external circuit includes a host processor.

19. The method of claim 18, further comprising:
    providing values of age bits in the age bit register to the host processor.

20. The method of claim 15, further comprising:
    generating, by the processing circuit, a notification message when the event register corresponding to the first age bit is set or cleared.

* * * * *